(12) United States Patent
Lopez

(10) Patent No.: US 8,565,394 B2
(45) Date of Patent: *Oct. 22, 2013

(54) UPDATING ROUTING PATTERNS IN AN ENTERPRISE NETWORK

(75) Inventor: Claudio Marcelo Lopez, Buenos Aires (AR)

(73) Assignee: Service Bureau Intetel S.A., Buenos Aires (AR)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,760

(22) Filed: May 18, 2012

(65) Prior Publication Data

US 2012/0231800 A1 Sep. 13, 2012

Related U.S. Application Data

(63) Continuation of application No. 12/035,845, filed on Feb. 22, 2008, now Pat. No. 8,184,786.

(60) Provisional application No. 60/891,694, filed on Feb. 26, 2007.

(51) Int. Cl.
| H04M 15/00 | (2006.01) |
| H04L 29/06 | (2006.01) |
| H04Q 3/66 | (2006.01) |
| H04W 40/04 | (2009.01) |

(52) U.S. Cl.
USPC ............ 379/114.02; 370/216; 370/230.1; 370/352; 370/400; 370/401; 379/88.01; 379/112.01; 379/130; 379/221.01; 379/221.02; 455/405; 455/445

(58) Field of Classification Search
USPC ......... 370/216, 221.01, 230.1, 235, 351, 352, 370/389, 400, 401; 379/112.01, 114.02, 379/221.01, 88.01, 130, 221.02, 389; 455/445, 405

See application file for complete search history.

(56) References Cited

U.S. PATENT DOCUMENTS

| 4,866,763 A | * | 9/1989 | Cooper et al. ............ 379/221.02 |
| 4,888,822 A | * | 12/1989 | Weinberger et al. .......... 379/130 |
| 4,972,464 A | * | 11/1990 | Webb et al. ............... 379/114.02 |
| 4,991,204 A | * | 2/1991 | Yamamoto et al. ...... 379/221.01 |
| 5,519,769 A | | 5/1996 | Weinberger et al. |

(Continued)

FOREIGN PATENT DOCUMENTS

| DE | 10027847 | 12/2001 |
| EP | 1499137 | 1/2005 |

(Continued)

OTHER PUBLICATIONS

Search Report issued in corresponding GB Application No. 0803516.4 issued Jun. 17, 2008; 4 pages.

(Continued)

*Primary Examiner* — Gerald Gauthier
(74) *Attorney, Agent, or Firm* — Fish & Richardson P.C.

(57) ABSTRACT

The present disclosure is directed to updating routing patterns in an enterprise network. In some implementations, a method for routing sessions includes identifying information associated with call sessions in an enterprise network. The information includes costs to an enterprise for using carrier services during the call sessions. Routing patterns for call sessions are dynamically updated through at least a portion of the enterprise network based, at least in part, on the costs associated with the call sessions.

16 Claims, 3 Drawing Sheets

(56) References Cited

U.S. PATENT DOCUMENTS

| | | | |
|---|---|---|---|
| 5,530,744 A | 6/1996 | Charalambous et al. | |
| 5,570,417 A | 10/1996 | Byers | |
| 5,764,741 A | 6/1998 | Barak | |
| 5,781,620 A * | 7/1998 | Montgomery et al. | 379/114.02 |
| 6,064,972 A | 5/2000 | Jankowitz et al. | |
| 6,208,719 B1 | 3/2001 | Lo et al. | |
| 6,240,169 B1 | 5/2001 | Haskins et al. | |
| 6,263,057 B1 | 7/2001 | Silverman | |
| 6,295,350 B1 | 9/2001 | Schreyer et al. | |
| 6,330,311 B1 * | 12/2001 | Mijares et al. | 379/112.01 |
| 6,442,258 B1 | 8/2002 | Mashinsky | |
| 6,557,044 B1 | 4/2003 | Cain et al. | |
| 6,657,989 B1 | 12/2003 | Hilsenrath | |
| 6,683,852 B2 | 1/2004 | Nagarajan et al. | |
| 6,829,221 B1 | 12/2004 | Winckles et al. | |
| 6,856,598 B1 | 2/2005 | Stanfield | |
| 6,895,083 B1 * | 5/2005 | Bers et al. | 379/88.01 |
| 6,956,820 B2 * | 10/2005 | Zhu et al. | 370/230.1 |
| 7,158,620 B2 * | 1/2007 | Kobrosly et al. | 379/114.02 |
| 7,209,472 B2 * | 4/2007 | Ohta et al. | 370/351 |
| 7,260,208 B2 * | 8/2007 | Cavalcanti | 379/221.01 |
| 7,286,828 B2 | 10/2007 | Schloemer | |
| 7,376,411 B2 * | 5/2008 | Thommana et al. | 455/405 |
| 7,489,635 B2 * | 2/2009 | Evans et al. | 370/235 |
| 7,519,353 B2 | 4/2009 | Stevens et al. | |
| 7,567,577 B2 * | 7/2009 | Thubert et al. | 370/401 |
| 7,570,754 B2 * | 8/2009 | Chin et al. | 379/221.02 |
| 7,577,131 B2 * | 8/2009 | Joseph et al. | 370/351 |
| 7,613,105 B2 * | 11/2009 | Bahl et al. | 370/216 |
| 7,664,119 B2 * | 2/2010 | Adams et al. | 370/400 |
| 7,760,701 B2 * | 7/2010 | Levy-Abegnoli et al. | 370/351 |
| 7,827,119 B2 | 11/2010 | Bjerre et al. | |
| 8,184,786 B2 * | 5/2012 | Lopez | 379/114.02 |
| 8,265,062 B2 * | 9/2012 | Tang et al. | 370/352 |
| 8,306,020 B2 * | 11/2012 | Dalton et al. | 370/352 |
| 2002/0097853 A1 * | 7/2002 | Ouijdani et al. | 379/114.02 |
| 2004/0203797 A1 * | 10/2004 | Burr | 455/445 |
| 2004/0223491 A1 * | 11/2004 | Levy-Abegnoli et al. | 370/389 |
| 2005/0281199 A1 | 12/2005 | Simpson et al. | |
| 2006/0146784 A1 * | 7/2006 | Karpov et al. | 370/351 |
| 2007/0053300 A1 | 3/2007 | Zhu et al. | |
| 2007/0165641 A1 | 7/2007 | Fitchett et al. | |
| 2008/0205613 A1 * | 8/2008 | Lopez | 379/114.02 |
| 2009/0238175 A1 * | 9/2009 | Joseph et al. | 370/352 |
| 2012/0231800 A1 * | 9/2012 | Lopez | 455/445 |
| 2012/0327946 A1 * | 12/2012 | Lawrence et al. | 370/401 |

FOREIGN PATENT DOCUMENTS

| | | |
|---|---|---|
| GB | 2416641 | 2/2006 |
| WO | 97/17506 | 2/1997 |
| WO | 99/17506 | 4/1999 |
| WO | 03/056801 | 7/2003 |

OTHER PUBLICATIONS

Examination Report issued in counterpart UK Application No. GB0803516.4; Dec. 8, 2010; 5 pages.

Official Action in corresponding ES Application No. 200800535 dated Dec. 28, 2010; 3 pages.

Search Report issued in corresponding ES Application No. 200800535; dated Oct. 6, 2011; 2 pages.

Official Action in corresponding ES Application No. 200800535 dated Jan. 22, 2013; 6 pages.

* cited by examiner

UPDATING ROUTING PATTERNS IN AN ENTERPRISE NETWORK

CLAIM OF PRIORITY

This application is a continuation and claims priority to U.S. patent application Ser. No. 12/035,845, filed on Feb. 22, 2008, which claims priority to U.S. Patent Application Ser. No. 60/891,694, filed on Feb. 26, 2007, the entire contents of which are hereby incorporated by reference.

TECHNICAL FIELD

This invention relates to telecommunication services and systems.

BACKGROUND

Communication networks include wired and wireless networks. Examples of wired networks include the Public Switched Telephone Network (PSTN) and the Internet. Examples of wireless networks include cellular networks as well as unlicensed wireless networks that connect to wired networks. Calls and other communications may be connected across wired and wireless networks.

SUMMARY

The present disclosure is directed to systems, methods, computer program products and apparatus for updating routing patterns in an enterprise network. In some implementations, a method for routing sessions includes identifying information associated with call sessions in an enterprise network. The information includes costs to an enterprise for using carrier services during the call sessions. Routing patterns for call sessions are dynamically updated through at least a portion of the enterprise network based, at least in part, on the costs associated with the call sessions.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
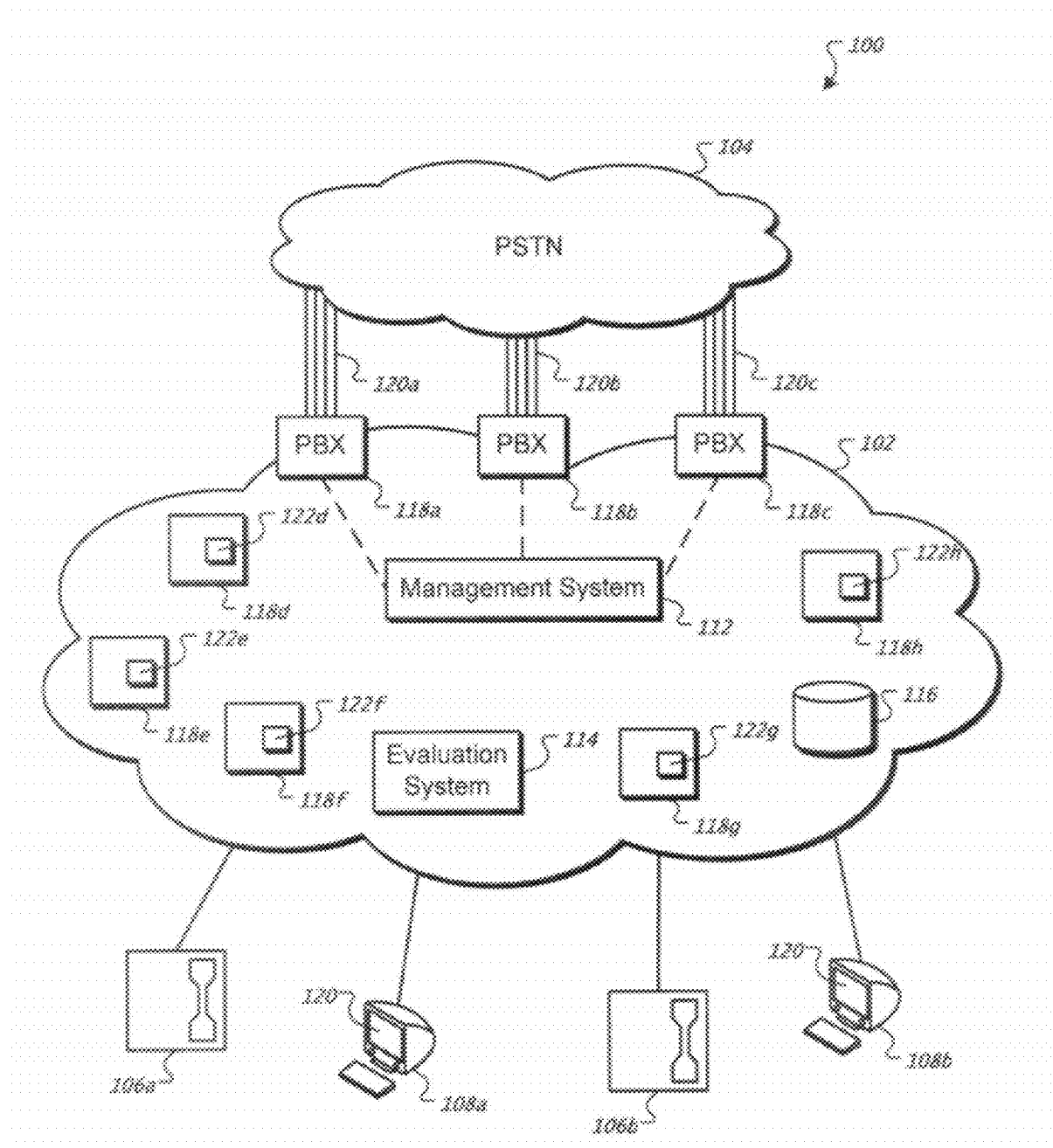
FIG. 1 is a block diagram illustrating an example communication system.

FIG. 1 is an example communication system 100 for dynamically updating call routing tables in an enterprise network. For example, the system 100 may dynamically update call routing tables in an enterprise network to eliminate, minimize, or otherwise reduce use of services provided by carriers (e.g., international calls, long-distance calls). In some implementations, the system 100 can rank, order, or otherwise identify dialed numbers participating in call sessions (e.g., VoIP) through the enterprise network based, at least in part, on frequency, associated costs, and/or other parameters. The system 100 may In accordance with the ranking, the system 100 can, in some implementations, dynamically update call routing tables in the enterprise network to eliminate, minimize, or otherwise reduce telecommunication costs. For example, the system 100 may route a call session between two remote portions of an enterprise network to avoid costs associated with long-distance call services. In some implementations, the system 100 can automatically execute one or more of the following: identify information for call sessions in an enterprise network, identify invoices from one or more carriers associated with the call sessions, rank dialed numbers participating in call sessions through the enterprise network, dynamically update routing patterns in the enterprise network based, at least in part, on the ranking, and/or generating reports indicating costs reduced by the updated routing. In executing one or more of these processes, the system 100 can, in some implementations, provide one or more of the following: dynamic routing table feed by actual usage and corporate line catalog; substantially error-free routing by substantially eliminating the need of manual data entry; dynamic node update when adding nodes to the enterprise network; and/or others.

At a high level, the system 100 can, in some implementations, include an enterprise network 102 and a public switched telephone network (PSTN) 104. The enterprise network 102 is a network associated with an enterprise. The enterprise may comprise a corporate or business entity, a government body, a non-profit institution, or any other organization with a plurality of assets 106, clients 108, a management system 112, an evaluation system 114, a resource database 116, and routing elements 118. The enterprise may be the owner of at least some of the assets 106, clients 108, the management system 112, the evaluation system 114, the resource database 116, and/or the routing elements 118. Of course, the enterprise may also lease one or more of the assets 106, clients 108, the management system 112, the evaluation system 114, the telecommunication database 116, and/or the routing elements 118 or may hire contractors or agents who are responsible for maintaining, configuring, controlling, and/or managing the assets 106, clients 108, the management system 112, the evaluation system 114, the resource database 116, and/or the routing elements 118. In some implementations, the enterprise manages the telecommunications services accessed by the assets 106 through the enterprise network 102. For example, the enterprise may dynamically distribute commands updating routing patterns for VoIP sessions including one or more assets 106. In the illustrated implementation, the enterprise network 102 facilitates wireless and/or wireline communication between the evaluation system 114, the routing elements 118, and/or other enterprise elements. The enterprise network 102 may communicate, for example, Internet Protocol (IP) packets, Session Initiation Protocol (SIP) packets, voice, video, data, and other suitable information between network addresses. In addition, while enterprise network 102 is illustrated as a single network, the enterprise network 102 may comprise a plurality of networks remotely distributed. Also, the enterprise network 102 may comprise different types of networks compatible with different protocols without departing from the scope of this disclosure.

The assets 106 comprise electronic devices operable to communicate call and/or data sessions in the enterprise network 102. As used in this disclosure, communication assets 106 are intended to encompass cellular phones, data phones, pagers, portable and stationary computers, smart phones, personal data assistants (PDAs), one or more processors within these or other devices, or any other suitable electronic or processing devices capable of communicating sessions in the enterprise network 102. Generally, the assets 106 may transmit voice, video, multimedia, text, web content or any other user/client-specific content. In short, the assets 106 generate requests, responses or otherwise communicate with other assets 106, assets external to the enterprise network 102, and/or PSTN 104.

The clients 108 a-b are any devices (e.g., computing devices) operable to connect or communicate with at least the evaluation system 114. Typically, a client 108 includes, executes, or otherwise presents a Graphical User Interface (GUI) 120 and comprises an electronic device operable to receive, transmit, process and store any appropriate data associated with the system 100. While the illustrated implementation includes the clients 108a-b, the enterprise network 102 may include any number of clients 108 communicably coupled to the evaluation system 114. The client 108 is intended to encompass a personal computer, touch screen terminal, workstation, network computer, kiosk, wireless data port, smart phone, personal data assistant (PDA), cellular phone, one or more processors within these or other devices, or any other suitable processing or electronic device used by a user viewing content from the evaluation system 114, such as cost savings associated with dynamically adjusting call routing tables. For example, client 108 may be a PDA operable to wirelessly connect with an external or unsecured network. In another example, the client 108 may comprise a laptop that includes an input device, such as a keypad, touch screen, mouse, or other device that can accept information, and an output device that conveys information associated with telecommunication services used by the enterprise network 102. Both the input device and output device may include fixed or removable storage media such as a magnetic computer disk, CD-ROM, or other suitable media to both receive input from and provide output to users of clients 108 through the display, namely the client portion of GUI 120.

GUI 120 comprises a graphical user interface operable to allow the user of client 108 to interface with at least a portion of system 100 for any suitable purpose, such as viewing configuration information, user settings, content including advertisements or other information. Generally, GUI 120 provides the particular user with an efficient and user-friendly presentation of data provided by or communicated within system 100. GUI 120 may comprise a plurality of customizable frames or views having interactive fields, pull-down lists, and buttons operated by the user. For example, GUI 120 is operable to display certain reports in a user-friendly form based on, for example, cost savings associated with updated routing patterns in the enterprise network 102. As previously mentioned, the system 100 may dynamically update call routing tables to maximize, enhance or otherwise increase the efficient use of services and determine cost savings based, at least in part, on these updates. GUI 120 can be configurable, supporting a combination of tables and graphs (bar, line, pie, status dials, etc.). The term graphical user interface may be used in the singular or in the plural to describe one or more graphical user interfaces and each of the displays of a particular graphical user interface. GUI 120 can be any graphical user interface, such as a generic web browser or touch screen, that processes information in system 100 and efficiently presents the results to the user. The evaluation system 114 can accept data from the client 108 via a web browser (e.g., Microsoft Internet Explorer or Netscape Navigator) and return the appropriate responses (e.g., HTML or XML) to the browser using the enterprise network 102.

The management system 112 can include any software, hardware, and/or firmware configured to track information associated with carrier services used in the enterprise network 102. For example, the management system 112 and/or routing elements 118 may receive information associated with used services and transmit such information to the evaluation system 114. In some implementations, the management system 112 may execute one or more of the following methods: receive information associated with telecommunication services (e.g., call detail records) routed through routing elements 118, translate received information to one or more different protocols compatible with the evaluation system 114, and transmit commands to routing elements 118 in accordance with information received from the evaluation system 114. In some implementations, the management system 112 may access the routing elements 118 and/or the routing elements 118 using different interfaces such as, for example, serial, TCP/IP socket, file transfer, XML SOAP, RLOGIN, HTTP, and others. In some implementations, the management system 112 periodically or otherwise transmits information to the evaluation system 114. For example, the management system 112 may store records in local files and transmit the records once a day. In some implementations, the management system 112 may transmit information to the evaluation system 114 in response to an event such as, for example, a request from a user.

The evaluation system 114 can include any software, hardware, and/or firmware configured to dynamically update routing patterns in the enterprise network 102. For example, the evaluation system 114 may rank dialed numbers associated with the routing elements 118 and automatically determine entries for the routing tables of these routing elements 118 in accordance with the rankings. In doing so, the evaluation system 114 may eliminate, minimize or otherwise reduce carriers services used by the enterprise network 102. In some implementations, the evaluation system 114 may execute one or more of the following: receive information identifying telecommunication services associated with sessions in the enterprise network 102, rank dialed numbers in accordance with costs for using carrier services during sessions, identify routing elements 118 in the enterprise network 102 in light of the ranked numbers, determine entries for routing tables of the routing elements 118 in accordance with the ranking and/or the identified routers, and/or automatically update the call routing tables of the routing elements 118 based, at least in part, on the determined entries. In regards to the received information, the evaluation system 114 can, in some implementations, generate or update locally stored files associated with the received information. For example, the evaluation system 114 may receive information associated with sessions, enterprise resources (e.g., routing elements 118), carrier charges, and/or others and update files associated with one or more routing elements 118 using the received information. In some implementations, the evaluation system 114 may receive invoices and/or information associated with carrier charges and generate and/or update files associated with the carrier.

In regards to determining entries in call routing tables, the evaluation system 114 can, in some implementations, store one or more of the following associated with the enterprise network 102: external numbers owned by the enterprise, availability of routing elements 118, area code presence, country code presence, mobile trunk presence, information associated with call sessions (e.g., number dialed, time, day, carrier), and/or others. Based, at least in part, on the call information, the evaluation system 114 can, in some implementations, rank the dialed numbers participating in sessions through the enterprise network 102. For example, the evaluation system 114 may rank dialed numbers in accordance with carrier charges including, for example, long distance, international and mobile calls. In connection with ranking usage, the evaluation system 114 can, in some implementations, evaluate the ranked numbers in accordance with criteria. For example, the evaluation system 114 may determine whether to update routing tables with information associated with a ranked number based, at least in part, on criteria. In some implementations, the criteria may include one or more of the following: calls to enterprise owned external numbers, calls to area and country codes with node presence, calls to mobile destinations with mobile trunk presence, calls to on-net destinations, and/or others. In connection with updating routing patterns with enterprise resources, the evaluation system 114 may determine costs reduced by the updated routes due to, for example, reducing usage of carrier services.

The resource database 116 can include any software, hardware, and/or firmware configured to store information associated with resources used, consumed or otherwise associated with the enterprise. For example, the resource database 116 may identify or store one or more of the following: public numbers used by the enterprise, area codes including routing elements 118, international codes including routing elements 118, dialed numbers assigned to enterprise assets 106, VPN numbers and/or others. In some implementations, the resource database 116 may transmit information to the evaluation system 114 in response to an event. Such events may include a request, an update to stored information, expiration of a period of time, and/or other event. For example, the resource database 116 may receive information indicating that routing elements 118 have been added to the enterprise network 102 and, in response to this update, transmit the updated information to the evaluation system 114. While illustrated as a single element, the resource database 116 may include multiple databases. In some implementations, the resource database 116 can include a public trunk inventory database, a customer branch database, and/or others. In this implementation, the public trunk inventory database that identifies the public numbers belonging to the enterprise and/or area codes where the enterprise has assets 106, and the customer branch database can identify portions of the enterprise network 102 to certain assets 106.

The routing elements 118 can include any software, hardware, and/or firmware configured to route call and/or data sessions through the enterprise network 102. In some implementations, call sessions include sending voice information in digital form in discrete packets. In some implementations, the routing elements 118 can determine a next routing elements 118 in the enterprise network 102 to which a packet is forward. In general, the routing elements 118 may perform one or more of the following: receive a session packet, identify a destination of the packet, determine a next network point (e.g., router 118, asset 106), transmit the packet to the determined network point, and/or automatically update routing information in response to at least receiving information from the evaluation system 114. The routing elements 118 may include one or more of the following: fixed wireless terminals, PBXs, microwave transmitters, VoIP routers, and/or others. In the illustrated implementation, the routing elements 118 includes one or more call routing tables 122 that identifies available routes for a packet. In some implementations, the call routing tables 122 may include criteria associated with available routes. Using the information included in the call routing tables 122, the routing elements 118 can, in some implementations, determine an appropriate route for a received session packet. In some implementations, the routing elements 118 can use algorithms (e.g., cost, distance) in determining a route. In some instances, routing may be a function associated with the Network layer (layer 3) in the standard model of network programming, the Open Systems Interconnection (OSI) model. In this example, the routing elements 118 may be a layer-3 switch.

In the case the routing elements 118 are PBXs, the PBXs 118*a-c* can include any software, hardware, and/or firmware configured to switch communication sessions between telecommunication assets 106 and/or PSTN 104. For example, the PBX 118 may represent a plurality of assets 106 to PSTN 104, which may reduce the number of trunks 120 to the PSTN 104. The trunks 120 comprise media for maintaining a call session between assets 106 in the enterprise network 102 and the PSTN 104. Each trunk 120 may be associated with a single asset 106 or multiple assets 106 may be associated with a single trunk 120. In addition to routing calls outside the enterprise, the PBX 118 can, in some implementations, switch call sessions between assets 106 in the enterprise network 102 independent of the PSTN 104. In some implementations, the PBX 118 transmits, to the management system 112, information identifying or otherwise 118 may transmit, to the management system 112, one or more of the following: destination number, carrier, call duration, service type, date, time, originating extension, trunk used, and/or others. In some implementations, the PBXs 118*a-c* can include includes one or more routing tables 119*a-c* that identifies available routes for communication sessions. In some implementations, the routing tables 119 may include criteria associated with available routes. Using the information included in the routing tables 119, the PBXs 118*a-c* can, in some implementations, determine an appropriate route for an identified communication session.

The PSTN network 104 is used for communicating, for example, via telephone land lines. In one implementation, the PSTN network 104 is of the form of a circuit-switched telephone network which may be used for land line voice calls, digital subscriber line (DSL) internet access, and/or dial-up modem internet access. A set of access tandem and end office switches segment the network into sections which are considered to be within a local calling distance. For example, communications relayed through the PSTN network 104 can be sent from a local user via an end office switch, through a series of access tandem switches, and through the remote end office switch to a remote user. In transmitting signals, PSTN 104 may use one or more of the following: telephones, key telephone systems, private branch exchange trunks 120, and certain data arrangements. Since PSTN 104 may be a collection of different telephone networks, portions of PSTN 104 may use different transmission media and/or compression techniques. Completion of a circuit in PSTN 104 between a call originator and a call receiver may require network signaling in the form of either dial pulses or multi-frequency tones.

In one aspect of operation, the management system 112 identifies carrier services used and transmits the information to the evaluation system 114. In connection with the used services, the resource database 116 may transmit information identifying resources in the enterprise network 102 including used numbers, asset locations, area codes, country codes, mobile trunk presences, Routing elements 118 and/or other information. In some implementations, the evaluation system 114 can store or otherwise identify carriers charges associated with services used during sessions in the enterprise network 102. The evaluation system 114 dynamically updates routing patterns in the enterprise network 102 for sessions to reduce usage/charges of carriers services. For example, the evaluation system 114 may dynamically update entries in the routing tables 122 based, at least in part, on the received information. In some implementations, the evaluation system 114 may automatically ranks dialed numbers in accordance with cost to the enterprise. Using the ranked numbers and information indicating resources included in the enterprise network 102, the evaluation system 114 may determine routes for sessions through the enterprise network 102 that minimize, eliminate or otherwise reduce use of carrier services. In reducing carrier services, the evaluation system 114 can, in some implementations, automatically reduce costs for the enterprise.

Figure 2:
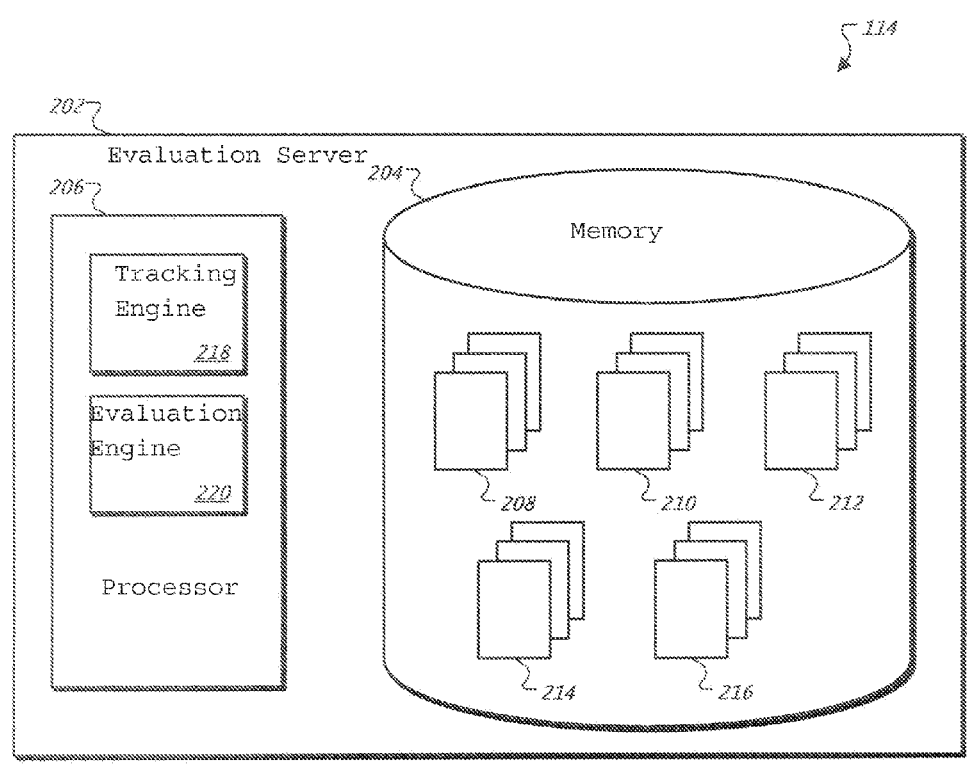
FIG. 2 is an example evaluation system of FIG. 1.

FIG. 2 is an example evaluation system 114 of FIG. 1 for dynamically updating routing patterns of sessions through the enterprise network 102. In the example shown, the evaluation system 114 comprises a single evaluation server 202 in the enterprise network 102, though other configurations are possible. In the illustrated implementation, the evaluation server 202 comprises an electronic computing device operable to receive, transmit, process and store data associated with the system 100. The system 100 can be implemented using computers other than servers, as well as a server pool. Indeed, the evaluation server 202 may be any computer, electronic or processing device such as, for example, a blade server, general-purpose personal computer (PC), Macintosh, workstation, Unix-based computer, or any other suitable device. In other words, the system 100 may include computers other than general purpose computers as well as computers without conventional operating systems. The evaluation server 202 may be adapted to execute any operating system including Linux, UNIX, Windows Server, or any other suitable operating system.

In the illustrated implementation, the evaluation server 202 includes memory 204 and a processor 206. The memory 204 may be a local memory and include any memory or database module and may take the form of volatile or non-volatile memory including, without limitation, magnetic media, optical media, random access memory (RAM), read-only memory (ROM), removable media, or any other suitable local or remote memory component. In the illustrated implementation, the memory 204 includes usage profiles 208, resource files 210, evaluation criteria 212, routing profiles 214, and reports 216. Though, the memory 204 can, in some implementations, include other data without departing from the scope of this disclosure. The usage profiles 208 can include one or more entries or data structures that include information associated with VoIP sessions through the enterprise network 102. For example, the usage profiles 208 may include or otherwise identify dialed numbers and associated carrier services used. In some implementations, the usage profiles 208 may include one or more of the following: numbers dialed, amount consumed (e.g., time, data amount), date, time, carrier charges, area codes, international codes, participating assets 106, participating portions of enterprise network 102, public trunk used, origination extension, service type and/or others. The usage file 208 may include or at least be based on information received from the management system 112. In some implementations, the usage profiles 208 include aggregated data associated with one or more parameters. For example, the usage profiles 208 may include aggregated usage data for a dialed number. In some implementations, the usage profiles 208 include or otherwise identify information associated with carrier invoices for services used during sessions.

The resource files 210 can include one or more entries or data structures that identify resources associated with the enterprise network 102. For example, the resource files 210 may include or otherwise identify public numbers used by the enterprise and associated assets 106. In some implementations, the resource files 210 may include one or more of the following: public numbers associated with enterprise, area codes with resources, country codes with enterprise resources, asset locations, mobile trunk presences, network addresses, Routing elements 118, router types, router commands, and/or others. For example, the resource files 210 may include or at least be based on information received from the resource database 116. In some implementations, the resource files 210 include or otherwise identify commands for updating entries in the routing tables 122.

Evaluation criteria 212 include any parameters, variables, algorithms, instructions, rules, objects and/or other directives for determining entries in the call routing tables 122. For example, the evaluation criteria 212 may include or otherwise identify directives for ranking numbers dialed and determining routes to the numbers dialed to reduce use/cost of carrier services. In other words, the evaluation criteria 212 may include directives for minimizing, eliminating or otherwise reducing the use/cost of services provide by the PSTN 104. In some implementations, the evaluation criteria 212 can identify one or more expressions (e.g., mathematical, logical) for determining routing patterns. In some implementations, the evaluation criteria 212 may include one or more criteria: calls to remote assets 106, calls to area and/or country codes with Routing elements 118, calls to mobile destinations with mobile trunk presences, calls to on-net destinations, and/or other criteria for identifying dialed numbers associated with enterprise resources and/or broadband services. In connection with dynamically determining routing entries, the evaluation criteria 212 may include or otherwise identify directives for determining cost saved or otherwise reduced in light of updated routing entries. In some implementations, the evaluation criteria 212 can identify one or more mathematical expressions for determining costs that the enterprise would have incurred from previous routing(s). Such expressions may be based on one or more parameters such as PBX type, time, associated service provider, duration, data amount, associated service contract, number dialed, and/or others.

Based, at least in part, on evaluating current routing, the routing files 214 include one or more entries or data structures that identify information for updating routing tables 122 in the enterprise network 120. For example, the routing file 214 may include a set of rules that can be used to determine routes for packets between routing elements 118. The routing files 214 may include one or more of the following: IP address of the packet's final destination, IP address of next hop, outgoing network interface, costs associated with different routes, routes, and/or other information. The routing file 214 may be associated with one or more routing element 118 or a single routing element 118 may be associated with multiple routing files 214.

The reports 216 include one or more entries or data structures that identify information associated with updated routing patterns through the enterprise network 102. For example, the report 216 may identify a specific routing element 118, updates to entries in associated routing tables 122, charges reduced by updates, and/or other information. The report 216 may be based or otherwise associated with one or more criteria. For example, the report 216 may be associated with one or more of the following criteria: one or more routing elements 118, dialed number, network saturation statistics, type of calls, type of routing used (national, regional, local), savings generated in comparison to previous routing pattern, and/or other information. In some implementations, the report 216 includes aggregated charges reduced for each criteria such as routing element 118, dialed number, and/or others. In addition, the report 216 may include information identifying actions that a user of the client 108 may perform in response to the displayed information. For example, the report 214 may enable the system or an administrator to adjust the network's bandwidth and/or increase or decrease trunk licenses.

Processor 206 executes instructions and manipulates data to perform operations of the evaluation server 202. Although FIG. 1 illustrates a single processor 206 in server 202, multiple processors 206 may be used according to particular needs, and reference to processor 206 is meant to include multiple processors 206 where applicable. In the illustrated implementation, processor 206 executes a tracking engine 218 and an evaluation engine 220 at any appropriate time such as, for example, in response to a request or input from a user of the server 202 or any appropriate system coupled with the network 102. The tracking engine 218 includes any software, hardware, and/or firmware, or combination thereof, operable to track resources in the enterprise network 102. For example, the tracking engine 218 may periodically or in response to another event transmit requests to the management system 112 for information associated with usage of services and/or the resource database 116 for information associated with resources in the enterprise network 102. In some implementations, the tracking engine 218 receives carrier invoices from the PSTN 104. In response to at least receiving information, the tracking engine 218 can, in some implementations, generate or update usage files 208 and/or resource files 210 based, at least in part, on the received information.

The evaluation engine 220 includes any software, hardware, and/or firmware, or combination thereof, operable to dynamically update call routing tables 122 in the enterprise network 102. For example, the evaluation engine 220 may rank numbers dialed in the enterprise network 102 in accordance with associated costs and determine alternate routing to reduce such costs. In some implementations, the evaluation engine 220 performs one or more of the following: ranks dialed numbers using one or more usage files 208, determines routes using resource files 210 and/or evaluation criteria 212, updates the routing tables 122 based, at least in part, on the determined route information, generates routing tables 214 and/or reports 216 based, at least in part, on determinations and/or other processes. In regards to ranking dialed numbers, the evaluation engine 220 can, in some implementations, aggregate data associated with dialed numbers and rank the dialed numbers based, at least in part, on the aggregated data. For example, the evaluation engine 220 may rank the dialed numbers in accordance with aggregated costs associated with certain dialed numbers. In the process of determining updated routes, the evaluation engine 220 may identify dialed numbers associated with assets 106, area codes having Routing elements 118, country codes having routing elements 118, and/or other information that may eliminate, minimize, or otherwise reduce usage/cost of services provided by carriers. For example, the evaluation engine 220 may identify a routing element 118 in an area code of a dialed number and route remote call sessions to the routing element 118 to reduce use of long-distance services provide by one or more carriers. In accordance with such determinations, the evaluation engine 220 can, in some implementations, automatically update entries in routing tables 122. In connection with updating routing information, the evaluation engine 220 can, in some implementations, determine costs reduced by the updated routing information. As mentioned above, the modified routing may reduce usage of carrier services and, as a result, may reduce costs of operating assets 106. Based, at least in part, on one or more of these determinations, the evaluation engine 220 may generate one or more reports 216.

Figure 3:
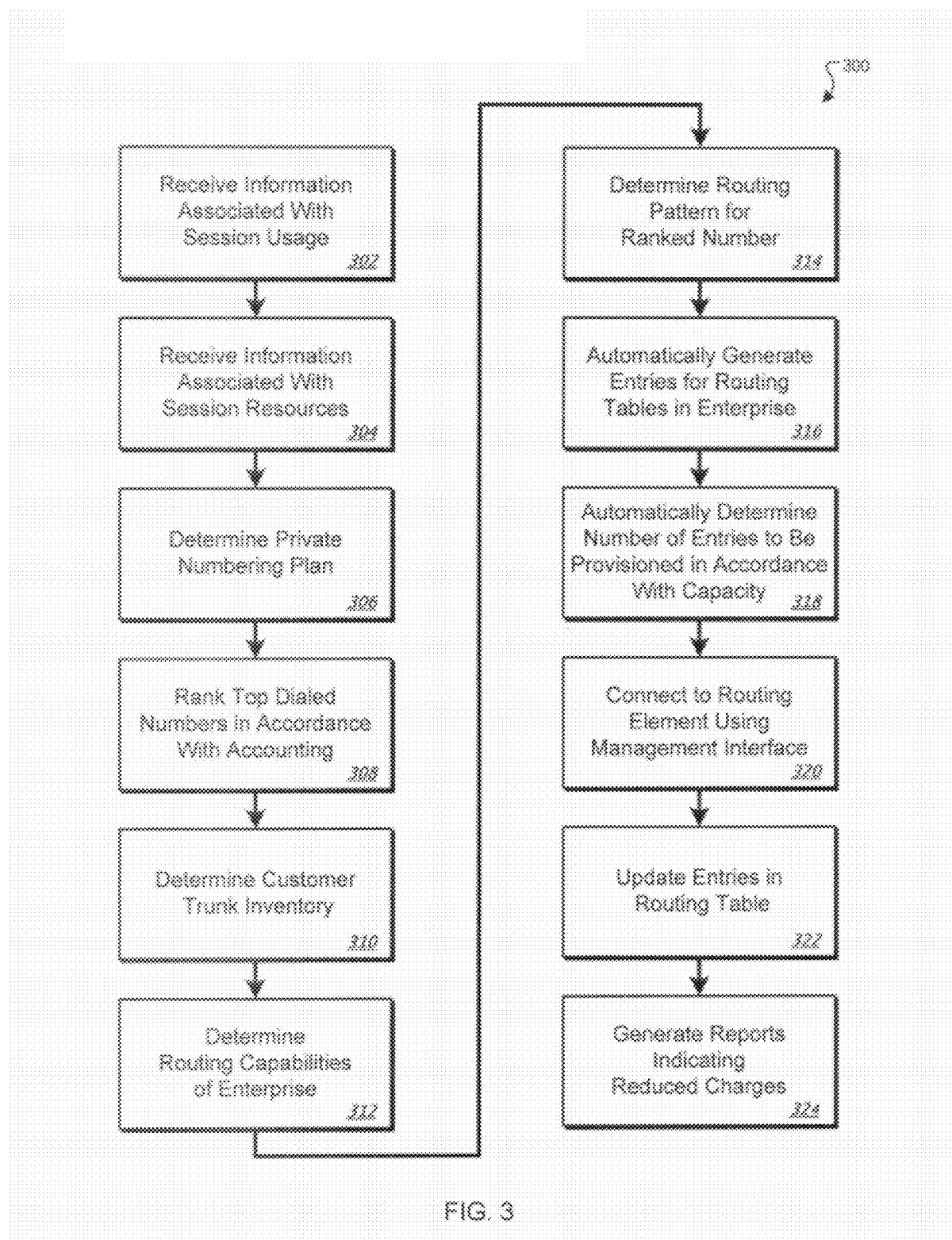
FIG. 3 is a flow chart illustrating an example method for updating routing patterns in an enterprise network.

FIG. 3 is a flowchart illustrating an example method 300 for managing carrier charges for trunks in an enterprise network in accordance with some implementations of the present disclosure. Generally, the method 300 describes dynamically updating routing information for sessions associated with an enterprise. The method 300 contemplates using any appropriate combination and arrangement of logical elements implementing some or all of the described functionality.

Method 300 begins at step 302 where information associated with usage associated with an enterprise is received. For example, the evaluation system 114 may receive amount of services used, invoices indicating costs of such services, and/or other information. At step 304, information identifying resources associated with the enterprise is received. In the example, the evaluation system 114 may receive information identifying assets 106, routing elements 118, numbers used by the enterprise, location information, network addresses, and/or other information associated with resources used by the enterprise. Next, at step 306, a private number system associated with the enterprise is determined. In some implementations, the countries and the enterprises numbering codes are analyzed such as how each type of call is coded (e.g., national, regional, mobile, fixed). In this implementation, the system can be configured to recognize the type of call that needs to be routed and a best way to do this. As for the example, the evaluation system 114 may identify an internal numbering plan used within the enterprise network 102 and map, link or otherwise associate the numbering plan to public phone numbers associated with the assets 106. The top dialed numbers are ranked in accordance with accounting information at step 308. Returning to the example, the evaluation system 114 may determine costs of sessions with assets 106 and rank the dialed numbers in accordance with the costs. In some implementations, the evaluation system 114 aggregates costs of using carrier services for sessions with dialed numbers and ranks the dialed numbers in accordance with the carrier charges. At step 310, the trunk inventory of the enterprise is determined. In some implementations, trunk inventory includes all public trunks (PSTN) the enterprise posses as well as all the channels that can be used internally to make a communications (VPN, others). In this implementation, a map of the channels available can be created in order to determine the best way to route a call, which may show all routing possibilities. Based on the inventory and depending on the type of call, the best channel to route the call is determined. Routing capabilities of the enterprise are determined at step 312. For example, the evaluation system 114 may identify the routing elements 118 and associated locations. Based, at least in part, on determining the routing capabilities, routing patterns for the ranked numbers are determined at step 314. Again in the example, the evaluation system 114 may determine routing patterns between assets 106 and ranked numbers in accordance with the routing elements 118 associated with the enterprise. In response to at least determining the updated routing tables, updated entries for routers associated with the enterprise are automatically generated at step 316. Next, at step 318, the number of entries that are to be provisioned are automatically determined in accordance with capacity. At step 320, connections to the routers are made using one or more management interfaces. In some implementations, the VoIP may operate using different interfaces. The entries in the routing tables are updated at step 322. In the example, the evaluation system 114 updates entries in the routing tables 122 to reduce usage of carrier services. In accordance with the updated routes, reports indicating reduced charges are generated at step 324.

A number of implementations of the invention have been described. Nevertheless, it will be understood that various modifications may be made without departing from the spirit and scope of the invention.

What is claimed is:

1. A method for routing sessions, comprising:
identifying information associated with call sessions in an enterprise network, wherein the information includes phone numbers participating in the call sessions and costs to an enterprise for using carrier services during the call sessions;
ranking the phone numbers participating in the call sessions in accordance with costs for using carrier services;
automatically determining updated routing patterns for one or more of the ranked phone numbers, wherein the updated routing patterns reduce usage of the carrier services; and
automatically updating the enterprise network to route call sessions with the one or more ranked phone numbers in accordance with the updated routing patterns.

2. The method of claim 1, further comprising:
identifying routing elements in the enterprise networks, the routing elements including routing tables; and
dynamically updating one or more entries in the routing tables based, at least in part, on the costs associated with the call sessions.

3. The method of claim 1, wherein automatically determining updated routing patterns comprises:
automatically determining one or more of the identified phone numbers is associated with at least one of a phone number assigned to the enterprise, an area code including a VoIP router, a country code including a VoIP router, a VoIP communication device, or a mobile trunk assigned to the enterprise; and
dynamically updating the routing pattern in accordance with the determination to reduce use of the carrier services.

4. The method of claim 1, wherein the enterprise network comprises a plurality of remote networks coupled through one or more broadband networks.

5. The method of claim 1, further comprising:
automatically identifying an addition of a routing element to the enterprise network; and
wherein routing patterns are automatically updated based, at least in part, on the added routing element.

6. The method of claim 1, wherein the information includes at least one of numbers dialed, time, day, or carrier used.

7. The method of claim 1, further comprising:
determining carrier costs reduced by the updated routing patterns; and
generating one or more reports based, at least in part, on the reduced costs and the updated routing patterns.

8. A system for routing sessions, comprising:
memory configured to store information associated with call sessions; and
one or more processors configured to:
identify information associated with call sessions in an enterprise network, wherein the information includes phone numbers participating in the call sessions and costs to an enterprise for using carrier services during the call sessions;
rank the phone numbers participating in the call sessions in accordance with costs for using carrier services;
automatically determine updated routing patterns for one or more of the ranked phone numbers, wherein the updated routing patterns reduce usage of the carrier services; and
automatically update the enterprise network to route call sessions with the one or more ranked phone numbers in accordance with the updated routing patterns.

9. The system of claim 8, further operable to:
identify routing elements in the enterprise networks, the routing elements including routing tables; and
dynamically update one or more entries in the routing tables based, at least in part, on the costs associated with the call sessions.

10. The system of claim 8, wherein the system operable to automatically determine updated routing patterns comprises the system operable to:
automatically determine one or more of the identified phone numbers is associated with at least one of a phone number assigned to the enterprise, an area code including a VoIP router, a country code including a VoIP router, a VoIP communication device, or a mobile trunk assigned to the enterprise; and
dynamically update the routing pattern in accordance with the determination to reduce use of the carrier services.

11. The system of claim 8, wherein the enterprise network comprises a plurality of remote networks coupled through one or more broadband networks.

12. The system of claim 8, further operable to:
automatically identify an addition of a routing element to the enterprise network; and
wherein route patterns are automatically updated based, at least in part, on the added routing element.

13. The system of claim 8, wherein the information includes at least one of numbers dialed, time, day, or carrier used.

14. The system of claim 8, further operable to:
determine carrier costs reduced by the updated routing patterns; and
generate one or more reports based, at least in part, on the reduced costs and the updated routing patterns.

15. A system for routing calls, comprising:
a means for identifying information associated with call sessions in an enterprise network, wherein the information includes phone numbers participating in the call sessions and costs to an enterprise for using carrier services during the call sessions;
a means for ranking the phone numbers participating in the call sessions in accordance with costs for using carrier services;
a means for automatically determining updated routing patterns for one or more of the ranked phone numbers, wherein the updated routing patterns reduce usage of the carrier services; and
a means for automatically updating the enterprise network to route call sessions with the one or more ranked phone numbers in accordance with the updated routing patterns.

16. The system of claim 15, further comprising:
a means for identifying VoIP routers in the enterprise networks, the VoIP routers including routing tables; and
a means for dynamically updating one or more entries in the routing tables based, at least in part, on the costs associated with the VoIP sessions.

* * * * *